United States Patent
Mundus

[15] 3,687,447
[45] Aug. 29, 1972

[54] APPARATUS FOR STACKING THERMOPLASTIC BAGS

[72] Inventor: Friedhelm Mundus, Schillerstrabe, Germany

[73] Assignee: Windmoller & Holscher, Westphalia, Germany

[22] Filed: Jan. 7, 1971

[21] Appl. No.: 104,565

[30] Foreign Application Priority Data

Jan. 16, 1970  Germany..........P 20 01 927.6

[52] U.S. Cl. ......................271/79, 198/180, 271/82
[51] Int. Cl. ............................................B65h 29/04
[58] Field of Search .............271/79, 82, 50; 198/180

[56] References Cited

UNITED STATES PATENTS

| | | | |
|---|---|---|---|
| 1,540,687 | 6/1925 | Feistel et al. | 271/79 UX |
| 3,307,846 | 3/1967 | Arvidson | 271/79 X |
| 3,543,980 | 12/1970 | Brockmuller | 271/79 X |
| 1,921,167 | 8/1933 | Perry | 271/50 |
| 2,226,674 | 12/1940 | Seybold | 271/79 |

FOREIGN PATENTS OR APPLICATIONS

473,337  10/1937  Great Britain...............271/79

Primary Examiner—Evon C. Blunk
Assistant Examiner—Bruce H. Stoner, Jr.
Attorney—Fleit, Gipple & Jacobson

[57] ABSTRACT

An apparatus for stacking thermoplastic bags having weld seams extending transversely to the direction in which they are received comprises: a plurality of gripping bars for grasping the leading edges of the bags and conveying them to a stacking station; a pair of confronting endless congruent guide grooves for receiving the ends of the gripping bars so they can be conveyed along the length of the conveying path; an upstream and a downstream pair of endless conveyor chains for conveying the gripping bars along the conveying path, the downstream pair of endless conveyor chains moving slower than the upstream pair of conveyor chains; and means for releasably attaching the gripping bars with said pairs of endless conveyor chains so that the gripping bars can be conveyed by said upstream chains from a bag receiving position to an intermediate location and wherein the bags can be further transferred by said downstream pair of chains from said intermediate location to a stacking position.

9 Claims, 7 Drawing Figures

FIG.1

Patented Aug. 29, 1972 3,687,447

INVENTOR
Friedhelm MUNDUS

By
Fleit, Gipple & Jacobson
his ATTORNEYS

FIG.5

INVENTOR
Friedhelm MUNDUS

By
his ATTORNEYS

Patented Aug. 29, 1972

INVENTOR
Friedhelm MUNDUS

By
Fleit, Gipple + Jacobson
his ATTORNEYS

APPARATUS FOR STACKING THERMOPLASTIC BAGS

The invention relates to an apparatus for stacking thermoplastic bags which have weld seams extending transversely to the direction in which they are received from a bag-making machine. In such a machine, the bags are made from a flattened thermoplastic tube or split tube by applying transverse weld seams at regular intervals along the tube and transverse severing.

Depositing of the bags that leave the machine in very rapid succession by throwing them into a stacking magazine or onto a stacking belt often gives rise to interruptions which are primarily caused by the intense flexibility and smoothness of the plastics bag material and especially by the transverse weld seam at the leading end of each bag. In contrast with bags made from stiffer materials such as paper, plastics bags do not retain the path in which they are flung from the machine. During ejection the bags are often displaced to one side or twisted and thus the edges of superposed bags in the stack are not in line. The weld seam at the leading edge of each bag aggrevates this problem because it often causes the leading edge to become corrugated and exert uncontrollable effects on the bag during its flight towards the stacking station, the deviations from the desired path being all the greater if the speed of ejection from the bag-making machine is high. Also, the weld seam causes the bag to be heavier at one end and partly turn over.

It has been found that these disadvantages occasioned whilst the bags are ejected from the machine cannot be overcome by throwing them onto a conveyor belt which slowly moves past the machine and on which the bags are to be laid in an overlapping arrangement.

Further difficulties are caused by the weld seams because they require a certain amount of time to cool off so that they will not adhere to superposed or overlapping adjacent bags. It is therefore necessary to provide a rather long conveying path between the welding station of the bag-making machine and the station where the bags are stacked or laid in an overlapping relationship. The length of this path must be longer the higher the output of the bag-making machine. Since modern machines have an extremely high output capacity, the total space required is therefore undesirably large.

The invention aims to provide stacking apparatus which enables bags to be stacked accurately with the edges aligned, takes up little space and yet allows sufficient time for the weld seams to cool off.

According to the invention, a stacking apparatus for thermoplastic bags which have weld seams extending transversely to the direction in which they are received from a bag-making machine comprises:

a. a plurality of gripping bars fitted with grippers for grasping the leading edges of the bags and conveying them to a stacking station;

b. a guide member on each side of the conveying path, the guide members being parallel and having confronting endless congruent guide grooves receiving the ends of the gripping bars;

c. two pairs of endless conveyor chains for the gripping bars arranged in planes parallel to the guide members, the pairs being arranged behind one another in the conveying direction so that an upstream pair follows the course of the guide grooves at the bag-receiving end of the apparatus and a downstream pair follows the course of the guide grooves at the location of the stacking station and moves at a slower speed than the upstream pair, the pairs of chains being led past one another in opposite directions in a common transverse vertical plane; and d. interengageable catch and latch means on the gripping bars and conveyor chains, respectively, arranged so that the latch means of the upstream pair of chains co-operate with the catch means of the gripping bars at the bag-receiving end of the apparatus and the latch means of the downstream pair of chains co-operate with the catch means of the gripping bars at the stacking station end of the apparatus, each gripping bar being transferred from one pair of chains to the other when it is in said vertical plane.

By means of the invention, the bags are grasped at their leading edges and are taken in a suspended condition to the stacking station. The gripping bars running along the guide grooves are transferred from the rapidly moving pair of conveyor chains to the slowly moving pair intermediate the bag-receiving end and the stacking station. The bags therefore reach the stacking station at a slower speed but with a smaller interval between successive bags. Positive guiding of the bags by means of the gripping bars avoids unintentional displacement of the bags at the stacking station and therefore the bags can be stacked with their edges aligned. During the slower conveying by the downstream pair of conveyor chains, the weld seams in the bags also have sufficient time to cool off. Further, damage that might be caused by a bag striking and rebounding from a fixed abutment is avoided. The suspended condition of the bags prevents the weld seams from touching the preceding bags and sticking to same. The small spacings between successive bags in the downstream pair of conveyor chains enables the structural length of the apparatus to be kept short.

A stationary drag table may be provided beneath the conveying runs of the pairs of conveyor chains for supporting the trailing edges of the bags conveyed by the gripping bars and means may be provided downstream of the drag table and beneath the downstream pair of conveyor chains for stacking the bags and carrying the stacks away. The drag table avoids the need for pulling the entire length of each bag over the trailing edges of the bags that are already stacked and therefore minimizes the danger of upsetting the stack. The means for carrying each stack of bags away permit the apparatus to be operated fully automatically.

In one form of the invention, the upstream pair of conveyor chains is offset from the downstream pair in a direction transversely to the conveying direction so as to define a gap between the chains at each side of the conveying path. The catch means of the gripping bars are adapted to extend into the respective gaps and are provided with two channels which have their mouths facing the respective chains on each side of the gap, the latch means of the conveyor chains comprising dogs which are engageable in the facing mouths of the channels. The dogs are guided in and out of open ends of the grooves at the position where the conveyor chains are being led past one another in opposite directions in the common vertical plane and this causes the gripping bars to be transferred from the upstream pair of chains to the downstream pair.

The vertical spacing of sprockets guiding the chains into and out of the said common vertical plane and the lengths of the said channels of the catch means are preferably inter-related so that, during transfer of each gripping bar, the latch means of the pair of chains receiving the bar will already be engaged with the associated catch means before the latter are released by the latch means of the other pair of chains. In this way one can ensure that the gripping bars are not left unsupported at any time once they are being transferred from one pair of conveyor chains to the other.

A pair of upper and lower feed rolls for the bags is preferably provided at the bag-receiving end of the apparatus, wherein the upper feed roll is raisable and lowerable in sequence with the cycle of the bag-making machine, the conveying plane of the feed rolls extends through open jaws of the grippers of each gripping bar when the latter is located in the conveying runs of the upstream pair of conveyor chains, and the feeding speed of the feed rolls is higher than the conveying speed of the upstream pair of chains. The pair of feed rolls is therefore effective for only a short period when the upper feed roll has been lowered onto the other feed roll. The feed rolls momentarily accelerate a bag severed at the bag-making machine so that it has a speed higher than the bag-making material and higher than that of the gripping bars and its leading edge is caused to pass between the open jaws of each gripper. When the apparatus is sued with bag-making machines equipped with separating welding beams (which simultaneously weld and sever the bag material), the feed rolls of the stacking apparatus will assist in severing each bag from the web of bag material.

The upper feed roll is preferably segmented, mounted in swing arms between direction-changing sprockets at the bag-receiving end for the upstream pair of conveyor chains, is driven in synchronism with said direction-changing sprockets and has a diameter larger than the pitch circle diameter thereof, and has a plurality of segments at equal angular spacings and equal in number to the number of gripping bars conveyed by the upstream pair of chains at equal intervals, the chain length of the upstream pair being a whole number multiple of the pitch circle circumference e of said direction-changing sprockets. This construction and arrangement of the pair of feed rolls enables one accurately to predetermine the extent of feeding of each bag by appropriately dimensioning the peripheral length of the segments and accurately to predetermine the feeding speed by selecting an appropriate diameter for the segments, the feeding speed being such that each bag is properly fed to the moving gripping bars of the upstream pair of conveyor chains. If the upper feed roll were to be fully cylindrical, variations in the feeding distance might be occasioned by less positive engagement and disengagement of the upper feed roll with the lower feed roll and this could lead to the grippers of the gripping bars engaging the still warm and soft transverse weld seam of a bag instead of the marginal portion direction behind the weld seam.

A simple drive for the segmented feed roll can be obtained if each aforementioned direction-changing sprocket is loosely mounted for rotation on a shaft and coupled to the segmented feed roll by a 1:1 transmission, the swing arms carrying the segmented feed roll being pivotally mounted on a shaft of the transmission and being each provided with a link at the side facing the sprocket shafts. The sprocket shafts comprise eccentrics engaging in the respective links and they are gear-driven so that one complete rotation thereof corresponds to one work cycle of the bag-making machine.

The apparatus of the invention is suitable for continuously as well as intermittently operating bag-making machines. In the former case, the conveying speed of the upstream pair of chains would be equal to or less than the conveying speed in the bag-making machine. In the latter case, where the intermittently operating machine would comprise feed rolls which, in order to cater for different bag widths or lengths, are driven by a crank drive of variable stroke through a free-wheeling ratchet device, the conveying speed of the upstream pair of conveyor chains must be so large that the web of bag-making material of the bag-making machine will not overtake a bag that is being transported by the stacking apparatus, it being borne in mind that during each feeding step in the bag-making machine the web of bag-making material moves at about twice the speed that the web would have in a continuously operating bag-making machine. The conveying speed of the upstream pair of conveyor chains of the stacking apparatus according to the invention must therefore be considerably higher for intermittently operating bag-making machines than for continuously operating machines. In conformity with the higher conveying speed, the intervals between the gripping bars when located in the upstream pair of conveyor chains would therefore have to be larger and the lengths of the chains would have to be correspondingly longer. Since a long structural length for the stacking apparatus is undesirable, the drive means for the upstream pair of conveyor chains may include variable gearing, preferably a pair of elliptical gears, at such an angular position that a phase of increased speed of the upstream conveyor chains substantially coincides with feeding of the web of bag-making material in the bag-machine. Since the speed variations of the upstream pair of conveyor chains are substantially sinusoidal, they will substantially correspond to the likewise sinusoidal speed variations of the web of bag-making material caused by the aforementioned crank drive of the feed rolls in the bag-making machine. The medium conveying speed of the upstream pair of conveyor chains of the stacking apparatus can therefore be considerably less than the speed required if the conveyor chains were to move at a constant speed. Accordingly, the intervals between the gripping bars in the upstream pair of conveyor chains will be smaller and an optimum short structural length is obtained for the stacking apparatus.

The spacing of the stacking apparatus from the welding tools of the bag-making machine is desirably equal to the length or width of the bags being made (depending on whether the bags are being received lengthwise or transversely by the stacking apparatus) so that each bag will be engaged in the stacking apparatus immediately after it has been severed from the web of material in the bag-making machine. To enable the spacing of the stacking apparatus from the bag-making machine to be adjusted to suit a variety of bag lengths or widths, it is preferred to mount it on a stationary base for reciprocation to and from the bag-making machine and to provide means for fixing the stacking apparatus at a desired spacing therefrom.

An example of the invention will now be described with reference to the accompanying drawings, wherein.

Figure 1:
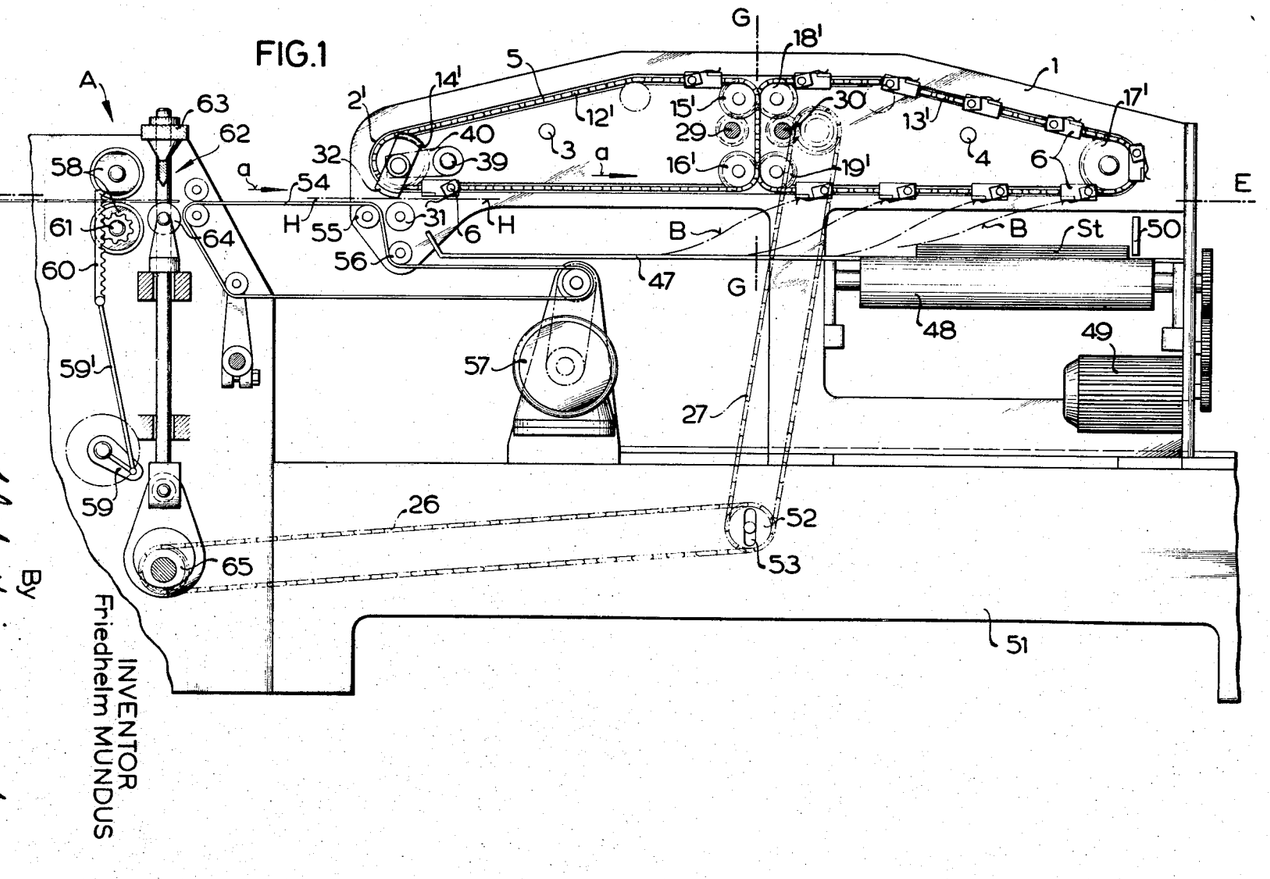
FIG. 1 is a longitudinal section through a stacking apparatus.
Figure 3:
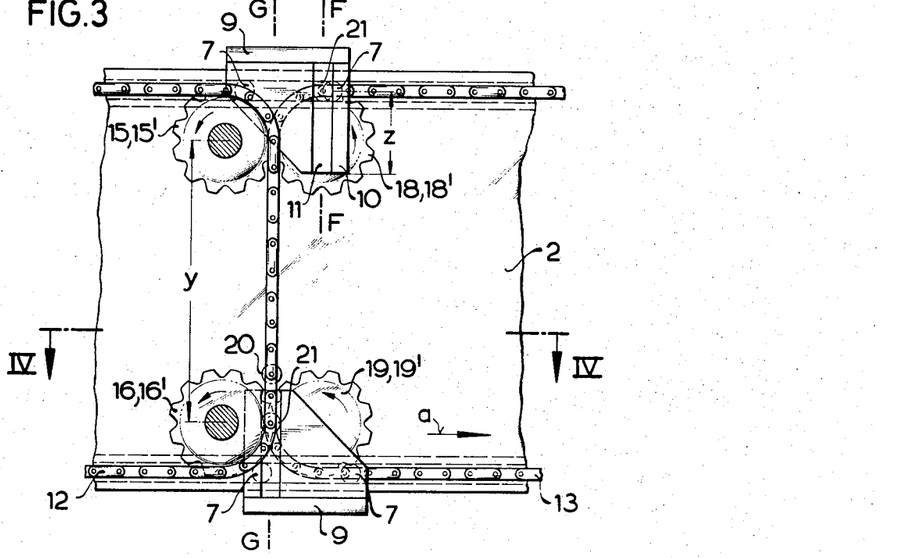
FIG. 3 is an enlarged fragmentary side elevation of the apparatus taken at a position where the gripping bars are transferred from one pair of conveyor chains to the other.
Figure 4:
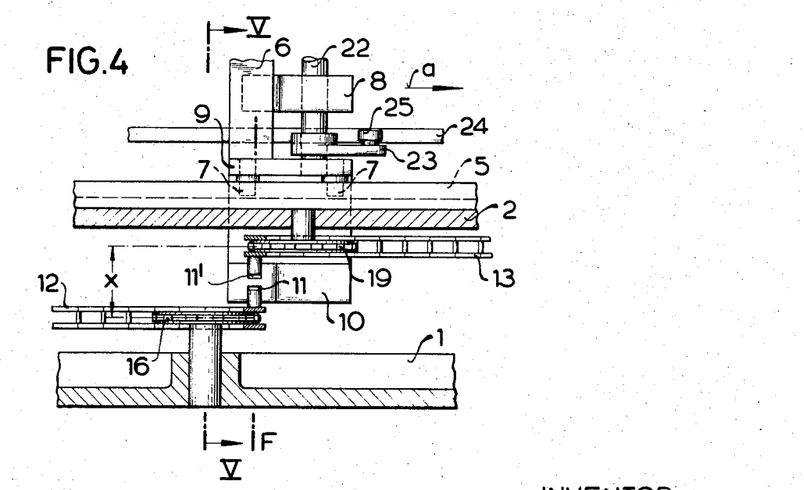
FIG. 4 is a horizontal section taken on the line IV—IV in FIG. 3.
Figure 5:
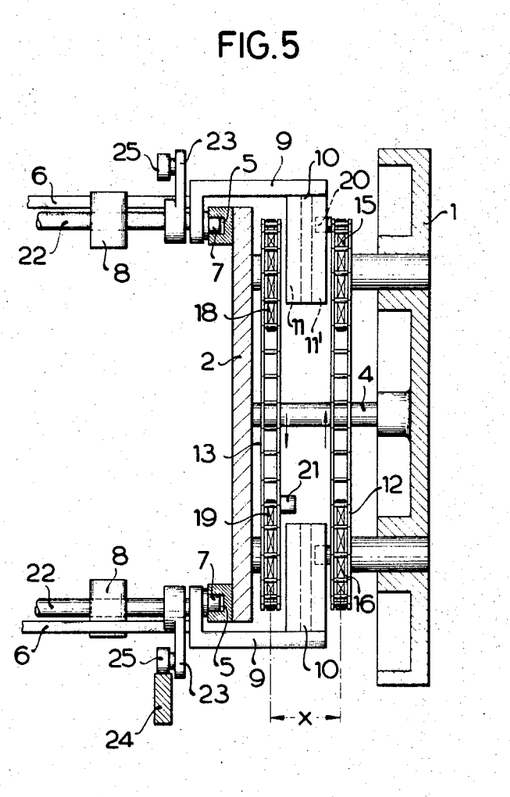
FIG. 5 is a section on the line V—V in FIG. 4.

Two guide members 2, 2' are fixed by means of bolts 3, 4 at a spacing from side walls of a frame 1 of the stacking apparatus in such a way that they extend parallel to one another lengthwise of the direction $a$ of a bag-making machine A behind which the stacking apparatus is arranged. The spacing of the guide members 2, 2' is at least equal to the width of a tube or split tube S of bag-making material that is being processed by the bag-making machine. As shown in FIGS. 1 and 5, endless guide grooves 5 are provided in the facing sides of the guide members 2, 2'. The guide grooves are congruent and have their mouths facing one another. As best seen in FIG. 1, the grooves follow a loop which has a rectilinear bottom section that is parallel to the conveying plane E—E of the bag-making machine A. Disposed between the guide members 2, 2' there are a plurality of gripping bars 6 which, as shown in FIGS. 3 to 5, are provided at their ends with guide pins 7 which slide in the guide grooves 5. The central portion of each gripping bar 6 is provided with a plurality of grippers 8 and the ends are provided with brackets 9, 9' forming part of catch means. As best seen in FIG. 5, each bracket 9 or 9' projects behind the guide member 2 or 2' and carries an extension 10 which projects into the gap between the frame 1 and the associated guide member 2 or 2'. Each extension 10 has two open vertical catch grooves 11, 11' of which one faces the frame 1 and the other the associated guide member 2 or 2'. The catch grooves 11, 11' of each gripping bar 6 lie in a common plane F—F (FIGS. 3 and 4) which extends transversely to the conveying direction $a$ and perpendicular to the guide grooves 5.

Figure 2:
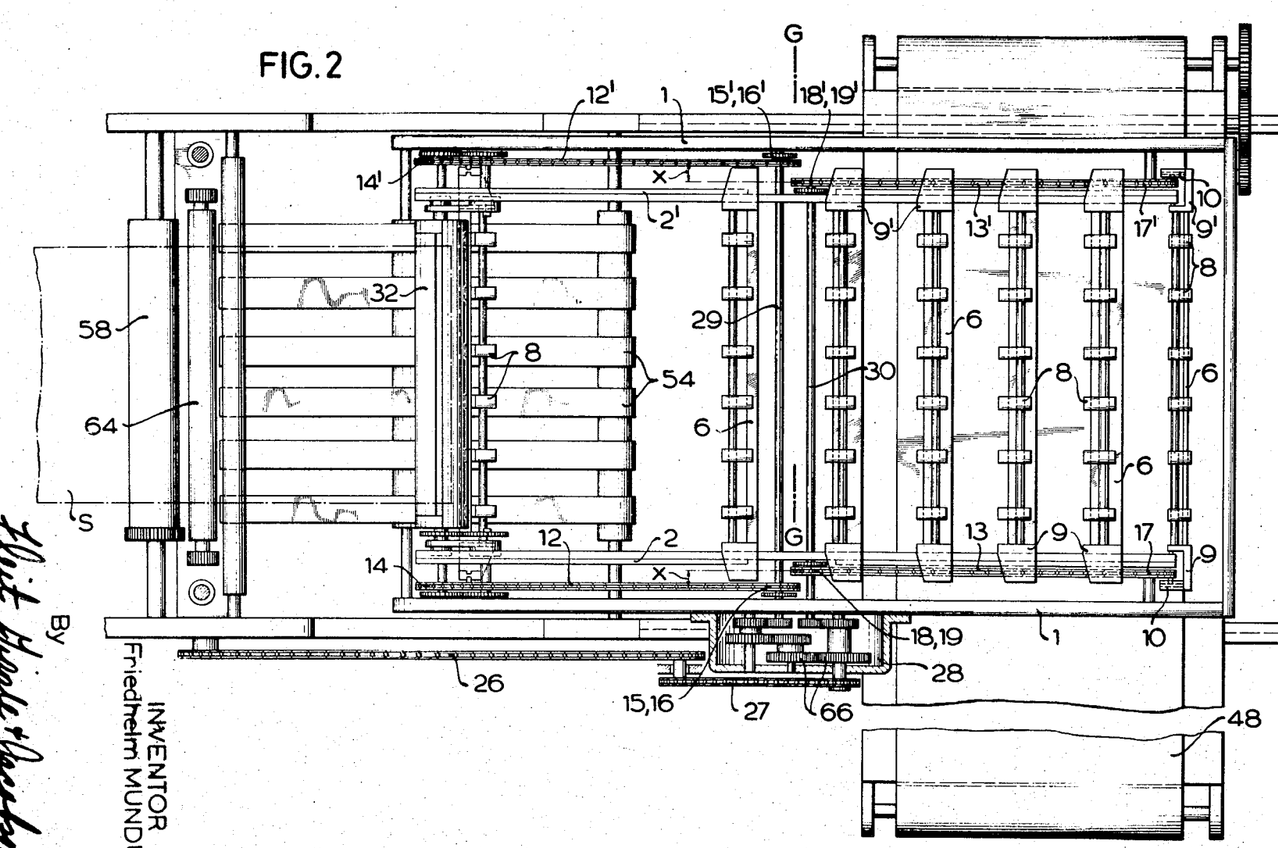
FIG. 2 is a plan view of the FIG. 1 apparatus.

Two pairs of conveyor chains 12, 12' and 13, 13' are provided in the two gaps between the frame 1 and the two guide members 2, 2'. The lower runs of the chains are the conveying runs and they move in the conveying direction $a$. The upstream chains 12, 12' extend around direction-changing sprockets 14, 14' at the bag-receiving end of the stacking apparatus (FIGS. 1 and 2) and follow the course of the guide grooves 5 up to about the middle of the frame 1, whereafter they are diverted into a transverse vertical plane G-G by guide sprockets 16, 16' and then back along the grooves by guide sprockets 15, 15', all the guide sprockets being mounted on the frame 1. Similarly, the downstream chains 13, 13' extend around sprockets 17, 17'; and follow the course of the guide grooves 5 except where they are diverted into the vertical plane G—G by pairs of sprockets 18, 18' and 19, 19' mounted on the guide members 2, 2'. As shown in FIGS. 2, 4 and 5, the chains 12 and 12' are laterally offset from the chains 12' and 13', respectively, by a distance $x$. Into the space formed by thus offsetting the chains, the extensions 10 of the catch means of the gripping bars 6 extend so that at each end of each gripping bar one of the catch grooves 11' faces the chain 12 or 12' of the upstream pair of conveyor chains and the other catch groove 11 faces the chain 13 or 13' of the downstream pair of conveyor chains. Latch bolts or dogs 20, 21 of the chains can engage in the associated catch grooves of the gripping bars so that all the gripping bars 6 are conveyed in he direction $a$ in parallel formation along the guide grooves 5. The conveying runs of the upstream pair of chains 12, 12' take each gripping bar in the direction $a$ up to the plane G—G where the chains are diverted upwardly and the latch bolts 20 therefore leave the grooves 11' whilst the gripping bar 6 remains in the plane G—G. In this position the latch bolts 21 of the downstream pair of chains 13, 13' (which move downwardly in the plane G—G) enter the catch grooves 11 of the extensions 10 and thus the gripping bar has now been transferred to the downstream chains and will continue to follow the horizontal section of the course of the guide grooves 5. This operation is repeated in the reverse order along the upper runs of the conveyor chains where, when a gripping bar has been taken to the plane G—G by the downstream chains, the latch bolts 21 move downwardly out of the grooves 11 to release the gripping bar whilst the upwardly moving latch bolts 20 enter the catch grooves 11' whereafter the gripping bar is carried along by the upstream chains.

As shown in FIGS. 4 and 5, the grippers 8 are seated on a common control shaft 22 which is pivotally mounted on the gripping bar 6. Opening and closing of the grippers is effected in conventional manner by means of a lever 23 which is fixed to the control shaft 22, carries a roller 25 and, whenever the roller rides up a fixed cam 24, causes the jaws of all the grippers of one gripping bar to open.

The conveying chains 12, 12' are driven at a different speed from the chains 13, 13' by means of drive chains 26, 27 of gearing 28 and transmission shafts 29, 30. The gearing 28 is designed so that the upstream pair of chains 12, 12' has about the same speed as the conveying speed of the tube of material S in the bag-making machine A whilst the downstream pair moves more slowly. The intervals between the latch bolts or dogs 20 on the upstream chains 12, 12' are at least equal to the largest length or width of bag that will be encountered plus the width of a gripping bar 6. The intervals between the latch bolts 21 on the downstream pair of conveyor chains are smaller corresponding to the speed ratio between the pairs of chains. In the illustrated example, the speed ratio is, for example, 5:1. Accordingly, the upstream pair of chains is equipped with two pairs of latch bolts 20 and the downstream pair with ten pairs of latch bolts 21. In this way the conveying speed of the gripping bars 6 when carried by the downstream chains is reduced to one fifth of the speed in the upstream chains.

To ensure that the gripping bars are positively engaged by the latch bolts 20 or 21 during transfer from one pair of conveyor chains to the other, with due regard to the speed ratios between the pairs of chains the spacing y (FIG. 3) between the guide sprockets 15, 15', 18, 18' and the guide sprockets 16, 16', 19, 19' and the length z of the catch grooves 11, 11' are so adapted to one another that the latch bolts of one pair of chains have engaged the gripping bar before the latch bolts of the other pair have been disengaged from their associated grooves.

Figure 6:
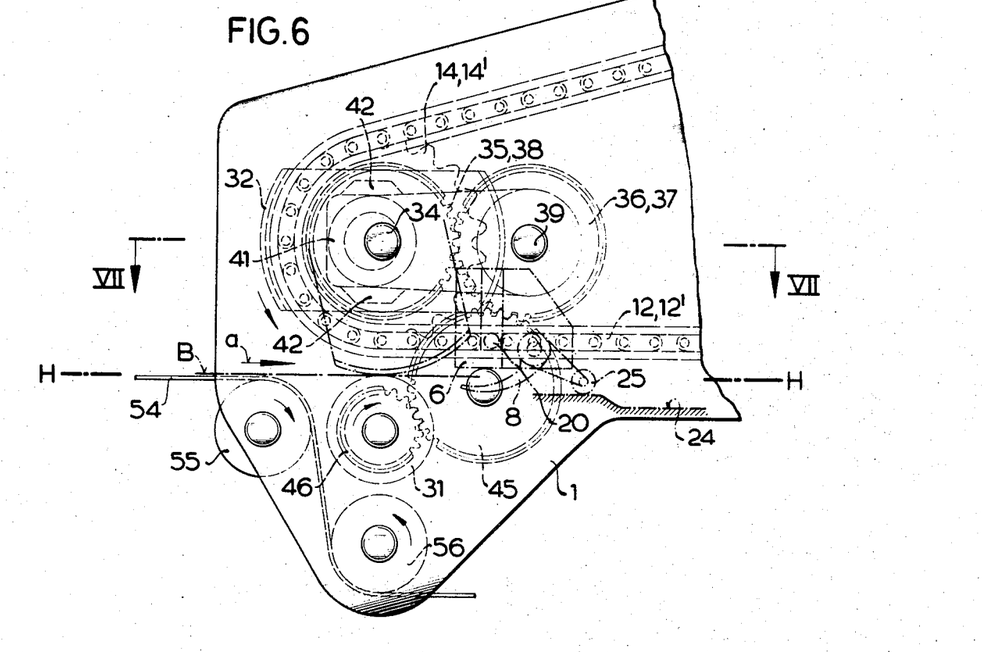
FIG. 6 is an enlarged fragmentary side elevation taken at the bag- receiving end of the upstream pair of conveyor chains.

At the receiving end of the stacking apparatus, a pair of feed rolls 31, 32 is provided for feeding bags B arriving from the bag-making machine A. The upper feed roll 32 can be raised and lowered in sequence with the operating cycle of the bag-making machine. The conveying plane H—H of the feed rolls passes (as shown in FIGS. 1 and 6) through the open jaws of the grippers of the gripping bars 6 located in the conveying run of the chains 12, 12' and the feeding speed is higher than the conveying speed of these chains. The upper feed roll is in the form of a segmented roll 32 mounted between the two direction-changing sprockets 14, 14' of the chains 12, 12' (FIG. 2). The feed roll 32 is driven from the direction changing sprockets through similar gearing at each side of the apparatus, only one side being shown in FIGS. 6 and 7. The sprocket 14 is loosely mounted on a shaft 34 and coupled to the roll 32 at a transmission ratio of 1:1 by means of transmission gears 35, 36, 37, 38. The gears 36 and 37 are fixed on a transmission shaft 39 which is rotatably mounted in the frame 1 and guide member 2 or 2'. The feed roll 32 is carried at each end by a swing arm 40 which is loosely rotatable on the transmission shaft 39. The sprocket shaft 34 is also rotatably mounted in the frame 1 and guide member 2 or 2'. At its end facing the segmented roll, the shaft 34 is provided with an eccentric 41 which engages in a link 42 on the swing arm 40. The sprocket shaft 34 is coupled to the transmission shaft 39 by gears 43, 44. The transmission ratio of these gears is chosen so that the shaft 34 with its eccentric 41 will rotate in conformity with the operating cycle of the bag-making machine A. Thus, the feed roll 32 rotates in synchronism with the sprockets 14, 14' and is moved towards and away from the backing feed roll 31 by means of the eccentric 41 in sequence with the operating cycle of the bag-making machine. The feed roll 32 has a larger diameter than the pitch circle diameter of the sprockets 14, 14'. Its peripheral speed is therefore higher than the conveying speed of the chains 12, 12' and the gripping bar 6 carried thereby. In order to ensure that for each cycle of the bag-making machine one segment of the feed roll 32 will be in contact with the feed roll 31, the length of the chains 12, 12' is selected so that it is a whole number multiple of the pitch circle circumference of the sprockets 14, 14'. The intervals between the latch bolts of the upstream conveyor chains correspond to the largest bag length or width that will be encountered. In the illustrated embodiment, the length of each chain 12, 12' is five times the pitch circle circumference of the direction-changing sprockets 14, 14'. The spacing between the latch bolts 20 on the chains 12, 12' is equal to half the chain length and thus the upstream pair of conveyor chains will always be transporting two gripping bars 6 and complete a circuit during each two operating cycles of the bag-making machine. Consequently, one operating cycle corresponds to two and a half rotations of the sprockets. In conformity with this the feed roll 32 is provided with two diametrally opposite segments and the transmission ratio between the sprocket shaft 34 and the feed roll 32 is 1:2.5 by appropriately selecting the gears 43, 44. For each rotation of the eccentric 41, the feed roll 32 therefore executes two and a half revolutions and its segments alternately contact the feed roll 31. The latch bolts 20 are so arranged on the chains 12, 12' that it is during such period of contact between the feed rolls 32 and 31 that one of the gripping bars 6 will be traversing the conveying plane H-H with its grippers 8 held open by the cam 24 as shown in chain-dotted lines in FIG. 6. The peripheral length of the segments of the feed roll 32 is selected so that a bag B fed at a higher speed than the conveying speed of the chains overtakes one of the gripping bars 6 and slips into the open jaws of the grippers with its leading edge, the extent of engagement of each bag with the grippers being such that, when the cam 24 releases the roller 25 to close the grippers, the bag will be engaged directly behind the weld seam at its leading edge. The feed roll 31 is driven by the transmission shaft 39 with the aid of gears 36, 45, 46 at a peripheral speed equal to that of the feed roll 32 (FIG. 6).

As shown in FIG. 1, a drag table 47 is fixed to the frame 1 beneath the conveying runs of the conveyor chains and this is followed by a transverse conveyor belt 48 located in the frame beneath the chains 13, 13' and intermittently driven by an electric motor 49. The cam 24 (FIGS. 4 to 6) extends right over the belt 48 and is there shaped so that it will open the grippers 8 as soon as the bag conveyed thereby is located above the belt 48. An abutment 50 serves to align the bags B edgewise after they have been released by the grippers.

The apparatus described thus far is reciprocatable on a base 51 and can be fixed at a desired spacing from the bag-making machine A. A pair of intermediate sprockets 52 for the chain drive 26, 27 is adjustable in a slot 53 of the base 51 so that the chain drive can be adapted to any adjustment of the stacking apparatus.

To transfer the bags B from the machine A to the stacking apparatus, a conveyor belt 54 is provided which, by means of guide rolls 55, 56 is diverted downwardly out of the common conveying plane E—E of the bag-making machine and the stacking apparatus and which is driven by an electric motor 57 in the direction a at a greater speed than the conveying speed of the bag-making machine.

Figure 7:
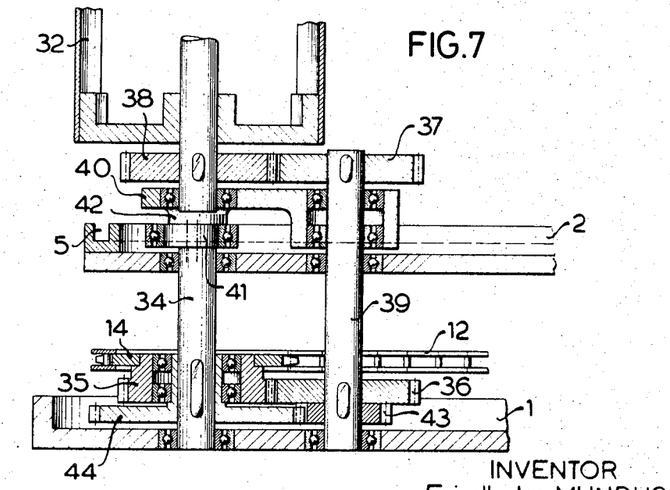
FIG. 7 is a section on the line VII—VII in FIG. 6.

The bag-making machine A as illustrated operates intermittently. It is equipped with a pair of feed rolls 58 which is intermittently rotated by a cam drive 59, 59' of variable stroke and a rack 60 and a free-wheeling ratchet device 61 in synchronism with the operating cycle of the machine so that it will feed the tube S of bag-making material by one bag length or width during each cycle. Downstream of the feed rolls 58, there is a separating welding apparatus 62 comprising a separating welding beam 63 which can be moved towards and away from a backing roll 64. The welding beam 63 is reciprocated by an eccentric drive 65 which is also synchronized to the machine cycle so that directly after standstill of the feed rolls the beam will be applied to the tube material S and when the tube material starts to move again the beam will be lifted off after completed welding. The beam 63 therefore applies transverse weld seams to the tubular bag material at intervals depending on the setting of the crank drive 59, 59' and will sever one bag during each operating cycle. If the starting material is a split tube, the feed rolls 58 will advance the material S by a distance equal to one bag width. The seams provided by the welding beam 63 will then form the longitudinal sides of each bag. In conformity with the feed set at the crank drive 59, 59', the spacing of the stacking apparatus from the machine A is set by adjustment on the frame 51 in such a way that the leading portion of the tube material will be advanced by the feed rolls 58 in conjunction with the conveyor belt 54 up to the feed roll 31 of the stacking apparatus. The angular setting of the drive 26, 27, 28 is so chosen in relation to the bag-making machine A that feeding of each severed bag B by the feed rolls 31, 32 starts directly after the welding beam 63 commences its upward stroke. Shortly before this, the segmented roll is lowered into its operative position by the eccentric 41 (FIGS. 6 and 7). One segment of the roll engages the bag lying on the roll 31 directly behind the weld seam at its leading end and threads it through the opened grippers 8 of a gripping bar 6 that is moving more slowly in front of it, as indicated in FIGS. 1 and 6. During feeding of the bag through the gripping bar 6 out of the range of the feed rolls 31, 32, the feed roll 32 is lifted off the bag by the eccentric 41. After the trailing end of the bag has left the feed roll 31, it drops onto the drag table 47 and the bag is suspended from the gripping bar in the sagging position shown in chain-dotted lines in FIG. 1. It will be noted that adjoining bags are not in contact with one another near their weld seams.

During the aforementioned transfer of each gripping bar from the upstream conveying chains to the downstream chains in the plane G—G, the speed of the bag gripped thereby is reduced sufficiently to give the weld seam sufficient time to cool off. As soon as the leading edge of the bag approaches the abutment 50, the grippers 8 are opened by means of the cam 24 and the bag is released and stopped by the abutment 50 to be accurately deposited on the transverse conveyor belt 48 at the stacking station. A counter (not shown) counts the number of bags deposited on each stack St and, depending on the setting of the counter, the conveyor belt 48 is moved as soon as a predetermined number of bags has been stacked, whereby the stack St is moved out of the way.

With an intermittently operating bag-making machine A as just described, the tubular bag material is fed by the feed rolls 58 immediately after a bag that has just been severed is fed by the feed rolls 31, 32. This means that the conveying speed of the upstream pair of conveyor chains 12, 12' must be at least equal to the fastest feeding speed of the tube material S occurring when large bags are being made; otherwise, the bags from the machine A might start to overtake the previously severed bags on the conveyor belt 54 and this would lead to damage caused by the soft weld seams. However, a high conveying speed for the upstream pair of chains calls for a correspondingly large interval between adjacent latch bolts 20 and therefore a long structural length for the stacking apparatus. To avoid this, a pair of elliptical gears 66 (FIG. 2) is included in the drive for the upstream pair of conveyor chains (FIG. 2). These elliptical gears can be readily accommodated within the housing for the gearing 28. Their angular position in relation to the rest of the drive gearing is such that the phase of increased speed caused thereby substantially coincides with the feeding phase of the tubular bag material S. The elliptical gears thus in good time accelerate the upstream conveyor chains to the high feeding speed of the tubular bag-making material and decelerate them again whilst the tubular material is stationary. In this way the average speed of the upstream conveyor chains is considerably reduced, thereby permitting a reduction in the intervals between adjacent latch bolts 20 and a corresponding reduction in the required structural length of the stacking apparatus. The reduction in structural lengths obtained with the aid of the elliptical gears 66 is an optimum because the crank drive 59, 59' in the feeding equipment for the tubular bag material as well as the elliptical gears 66 in the drive for the bags give rise to sinusoidal speed variations which are in phase with one another so that the distance between the tubular bag material and a bag that has just been severed remains practically constant during the next feeding stage of the bag-making material.

I claim:

1. Stacking apparatus for thermoplastic bags which have weld seams extending transversely to the direction in which they are received from a bag-making machine, comprising:

a. a plurality of gripping bars fitted with grippers for grasping the leading edges of the bags and conveying them to a stacking station;

b. a guide member on each side of the conveying path, the guide members being parallel and having confronting endless congruent guide grooves receiving the ends of the gripping bars;

c. two pairs of endless conveyor chains for the gripping bars arranged in planes parallel to the guide members, the pairs being arranged behind one another in the conveying direction so that an upstream pair follows the course of the guide grooves at the bag-receiving end of the apparatus and a downstream pair follows the course of the guide grooves at the location of the stacking station and moves at a slower speed than the upstream pair, the pairs of chains being led past one another in opposite directions in a common transverse vertical plane, said upstream pair of conveyor chains being offset from the downstream pair in a direction transversely to the conveying direction so as to define a gap between the chains at each side of the conveying path, d. interengageable catch means on the gripping bars each comprising an extension adapted to extend vertically to the conveying direction into the respective gaps between the chains, each extension being provided with two channels which have their mouths facing the respective chains on each side of the gap; and e. interengageable latch means on the conveyor chains each comprising lateral dogs engageable in the facing mouths of the channels, said catch and latch means arranged so that the latch means of the upstream pair of chains co-operate with the catch means of the gripping bars at the bag-receiving end of the apparatus and the latch means of the downstream pair of chains co-operate with the catch means of the gripping bars at the stacking station end of the apparatus, each gripping bar being transferred from one pair of chains to the other when it is in said vertical plane.

2. Apparatus according to claim 1, wherein the conveying path is substantially horizontal, including a stationary drag table beneath the conveying runs of the pairs of conveyor chains for supporting the trailing edges of the bags conveyed by the gripping bars, and means located downstream of the drag table and beneath the downstream pair of conveyor chains for stacking the bags and carrying the stacks away.

3. Apparatus according to claim 1, wherein the vertical spacing of sprockets guiding the chains into and out of the said common vertical plane and the lengths of the said channels of the catch means are interrelated so that, during transfer of each gripping bar, the latch means of the pair of chains receiving the bar will already by engaged with the associated catch means before the latter are released by the latch means of the other pair of chains.

4. Apparatus according to claim 1 including a pair of upper and lower feed rolls for the bags at the bag-receiving end of the apparatus, wherein the upper feed roll is raisable and lowerable in sequence with the cycle of the bag-making machine, the conveying plane of the feed rolls extends through open jaws of the grippers of each gripping bar when the latter is located in the conveying runs of the upstream pair of conveyor chains, and the feeding speed of the feed rolls is higher than the conveying speed of the upstream pair of chains.

5. Apparatus according to claim 4, wherein the upper feed roll is segmented, is mounted in swing arms between direction-changing sprockets at the bag-receiving end for the upstream pair of conveyor chains, is driven in synchronism with said direction-changing sprockets and has a diameter larger than the pitch circle diameter thereof, and has a plurality of segments at equal angular spacings and equal in number to the number of gripping bars conveyed by the upstream pair of chains at equal intervals, the chain length of the upstream pair being a whole number multiple of the pitch circle circumference of said direction-changing sprockets.

6. Apparatus according to claim 5, wherein each said direction-changing sprocket is loosely mounted for rotation on a shaft and coupled to the segmented feed roll by a 1:1 transmission, the swing arms carrying the segmented feed roll are pivotally mounted on a shaft of the transmission and are each provided with a link at the side facing the sprocket shafts, the sprocket shafts comprise eccentrics engaging in the respective lengths, and the sprocket shafts are gear-driven so that one complete rotation thereof corresponds to one work cycle of the bag-making machine.

7. Apparatus according to claim 1 for an intermittently operating bag-making machine, wherein drive means for the upstream pair of conveyor chains include variable gearing at such an angular position that a phase of increased speed of the upstream conveyor chains substantially coincides with feeding of the bag material in the bag-making machine.

8. Apparatus according to claim 7, wherein the variable gearing comprises a pair of elliptical gears.

9. Apparatus according to claim 1 mounted on a stationary base for reciprocation to and from the bag-making machine and adapted to be fixed at a desired spacing therefrom.

* * * * *